June 28, 1938.  C. O. WILSON  2,122,079

SPRINKLER

Filed May 21, 1937   2 Sheets-Sheet 1

INVENTOR.
Charles O. Wilson
BY Rice and Rice
ATTORNEYS.

Witness:
John S. Braddock

June 28, 1938.  C. O. WILSON  2,122,079
SPRINKLER
Filed May 21, 1937  2 Sheets-Sheet 2

INVENTOR.
Charles O. Wilson
BY Rice and Rice
ATTORNEYS.

Witness:
John S Braddock

Patented June 28, 1938

2,122,079

UNITED STATES PATENT OFFICE 2,122,079

SPRINKLER

Charles O. Wilson, North Muskegon, Mich., assignor to March Automatic Irrigation Company, Muskegon, Mich., a corporation of Michigan Application May 21, 1937, Serial No. 143,878

1 Claim. (Cl. 299—49)

The present invention relates to sprinklers, particularly travelling sprinklers intended for horticultural purposes and the watering of lawns, etc.: and its object is to provide an improved sprinkler of that character having a member rotatable about a vertical axis, carrying sprinkling nozzles and driven by the pressure of water supplied to the sprinkler for the double purpose of rotating the nozzles and travelling the sprinkler over the ground.

This and any other and more specific objects hereinafter appearing are attained by, and the invention finds preferable embodiment in, the illustrative structure particularly described in the body of this specification and illustrated by the accompanying drawings, in which.

Figures 1, 2:
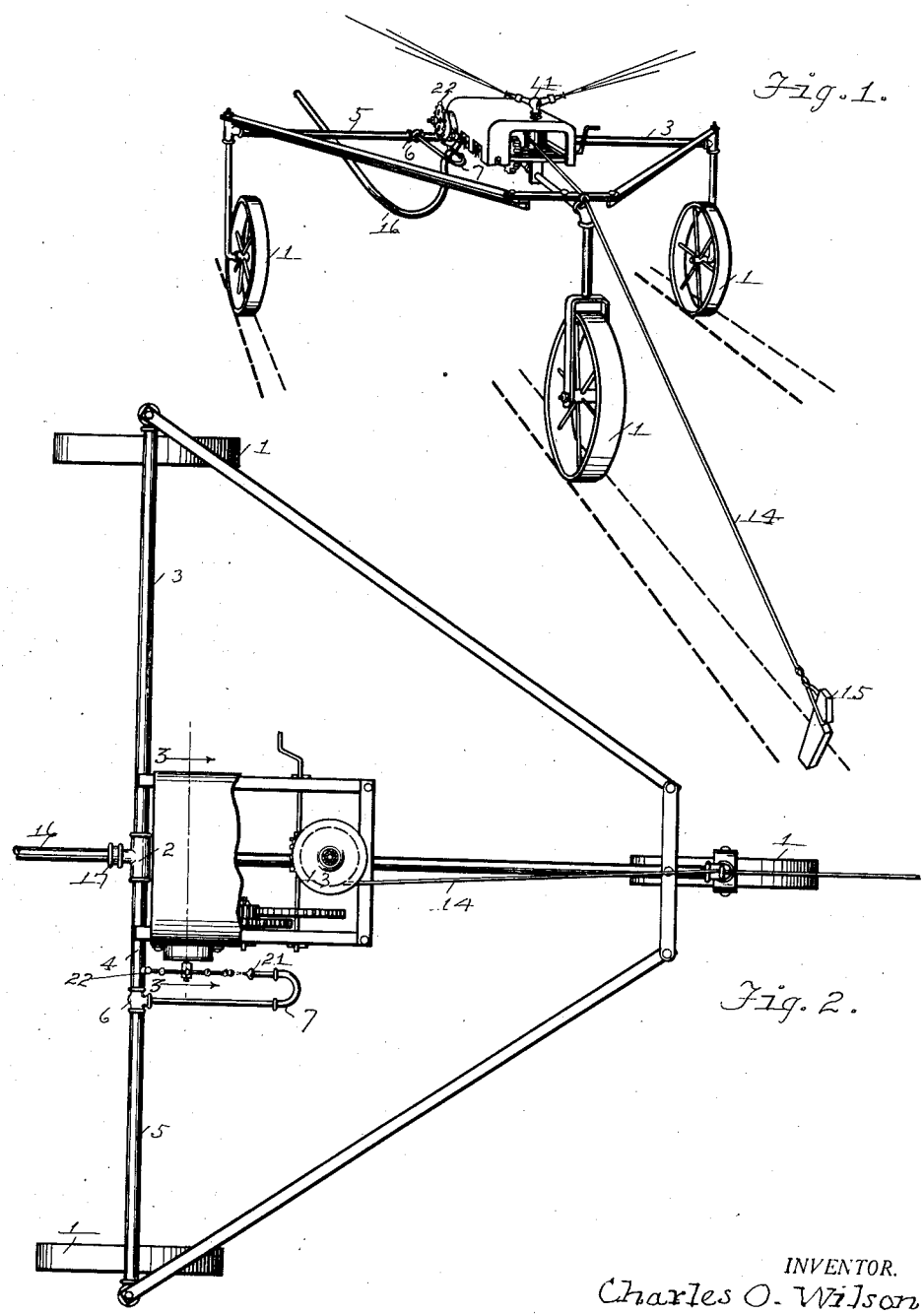
Figure 1 is a perspective view of my travelling sprinkler in operation.
Figure 2 is a top plan view thereof with the sprinkler head removed.
Figure 3:
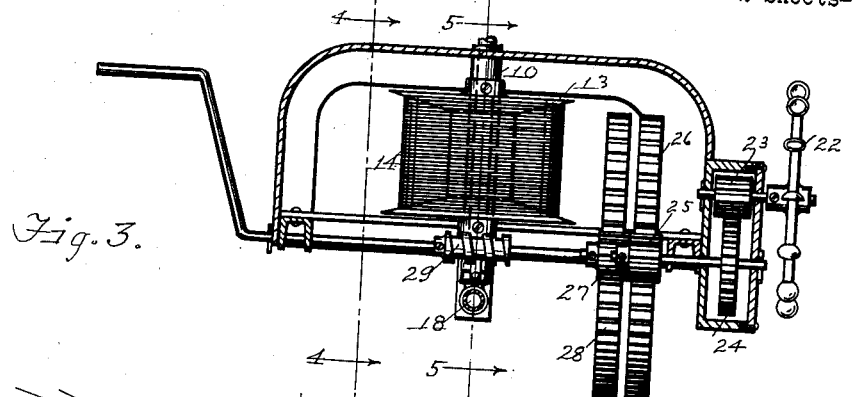
Figure 3 is a transverse vertical sectional view of the sprinkler taken on line 3—3 of Figure 2, showing the operating mechanism.
Figure 4:
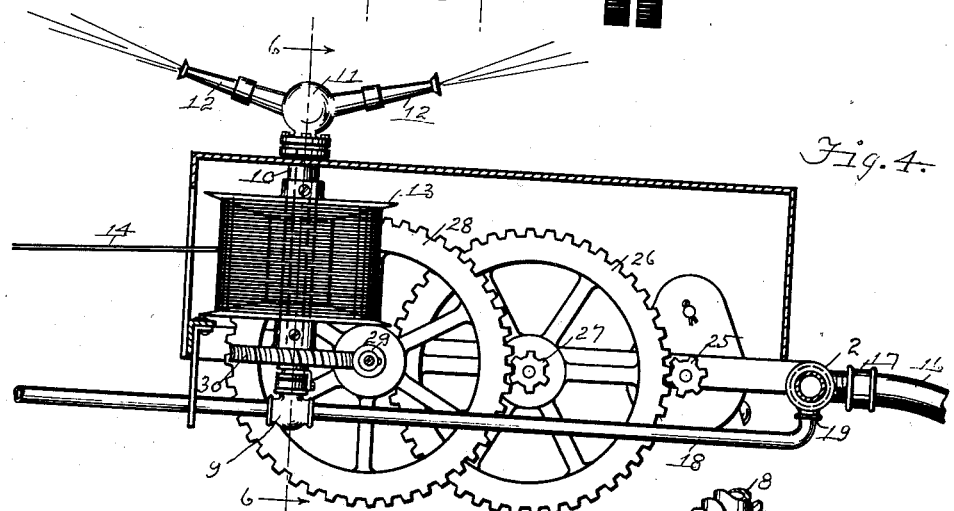
Figure 4 is a longitudinal vertical sectional view of the same taken on line 4—4 of Figure 3.
Figure 5:
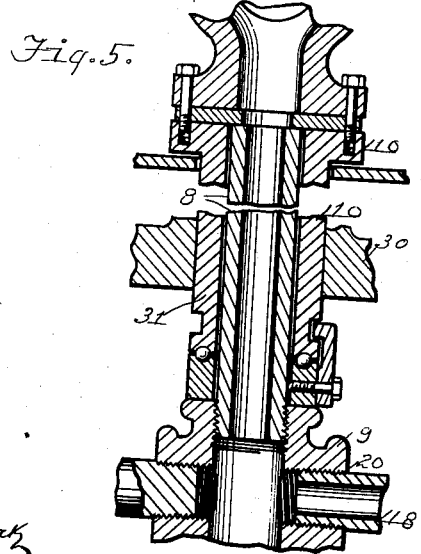
Figure 5 is an axially sectional view of portions of the rotatable member of the sprinkler with connected parts taken on line 5—5 of Figure 3, certain parts being broken away.
Figure 6:
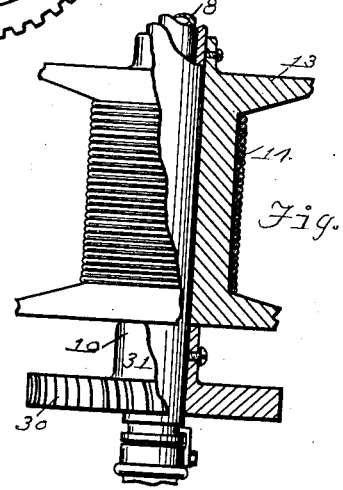
Figure 6 is an elevational view of portions of said rotatable member with connected parts, shown partly in axial section taken on line 6—6 of Figure 4, certain parts being broken away.

In these drawings is illustrated a travelling sprinkler having a triangular chassis carried on the vehicle wheels 1, this chassis including a tubular coupling 2 with oppositely extending horizontal arms 3 and 4, 5. To the tubular portion 4 of one of these arms is connected by the tubular coupling 6 a U-shaped pipe 7. On the vertical tubular axle 8 fixed in the tubular coupling 9 is mounted the member 10 rotatable thereon and carrying the sprinkler head 11 having nozzles 12, said member 10 carrying also a drum 13 on which is wound a cable 14 fastened to a stake 15. Said member 10 with the nozzles 12 and the drum 13 is rotated by the pressure of water supplied to the sprinkler from a suitable source (not shown), through a flexible hose 16 drawn along the ground by the sprinkler's travel. This hose is connected at 17 with the coupling 2, and the water for sprinkling passes therethrough and through the pipe 18 connected at 19 with this coupling and at 20 with said coupling 9 in which said axle 8 is mounted, the water discharging through this axle and the sprinkler head 11 and its nozzles 12 which rotate with member 10. The water for rotating the member 10 passes through said tubular portion 4, coupling 6 and pipe 7, and issuing from its nozzle 21 drives the pelton wheel 22 which, through a train of gears 23, 24, 25, 26, 27, 28, worm 29 and worm gear 30 tight on the sleeve portion 31 of said rotatable member 10, rotates said member to rotate the nozzles 12 and the drum 13 (Figures 3, 4, 5, 6).

It will be seen that this sprinkler is of simple construction having few parts, for the same rotatable member driven by water pressure travels the sprinkler and also rotates the sprinkler head for watering the ground.

I claim:

In a sprinkler adapted to be travelled over the ground: a vertical tubular axle; a member rotatable on the axle carrying rotatably with said member a drum and a sprinkler head having a water passage whereinto the tubular axle opens; a cable wound on the drum adapted to be anchored in a fixed position; means operated by a water stream for rotating said member to travel the sprinkler and rotate the sprinkler head; means for supplying water under pressure including a water passage having a branch leading into the tubular axle and a branch for directing said water stream to the first mentioned means for operating the same.

CHARLES O. WILSON.